United States Patent
Roumier et al.

(10) Patent No.: US 11,804,720 B2
(45) Date of Patent: Oct. 31, 2023

(54) ELECTRICAL ARCHITECTURE

(71) Applicant: Aptiv Technologies Limited, St. Michael (BB)

(72) Inventors: Cyril Roumier, La Rochelle (FR); Guillaume Tournabien, Saint Soupplets (FR)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/806,853

(22) Filed: Jun. 14, 2022

(65) Prior Publication Data

US 2022/0399727 A1    Dec. 15, 2022

(30) Foreign Application Priority Data

Jun. 14, 2021 (EP) ................... 21179198

(51) Int. Cl.
   *H02J 7/00* (2006.01)
(52) U.S. Cl.
   CPC .......... *H02J 7/0014* (2013.01); *H02J 7/0047* (2013.01)
(58) Field of Classification Search
   CPC .................................................. H02J 2207/20
   See application file for complete search history.

(56) References Cited

U.S. PATENT DOCUMENTS

| | | | |
|---|---|---|---|
| 5,396,970 A | 3/1995 | Ono | |
| 9,209,638 B2 * | 12/2015 | Bouman | B60L 53/20 |
| 10,676,052 B2 * | 6/2020 | Doernbach | H03K 19/0075 |
| 10,838,474 B2 * | 11/2020 | Niwa | B60L 50/15 |
| 2010/0065349 A1 * | 3/2010 | Ichikawa | B60L 53/18 |
| | | | 307/29 |

(Continued)

FOREIGN PATENT DOCUMENTS

| | | | | |
|---|---|---|---|---|
| DE | 102016103829 | | 9/2017 | |
| DE | 102016103829 A1 * | | 9/2017 | B60R 16/03 |

(Continued)

OTHER PUBLICATIONS

DE-102016103829_translation, Froeschl J, (Year: 2017).*

(Continued)

*Primary Examiner* — Drew A Dunn
*Assistant Examiner* — Tynese V McDaniel
(74) *Attorney, Agent, or Firm* — Colby Nipper PLLC

(57) ABSTRACT

An electrical architecture includes multiple nodal controllers, at least two power sources, and a power supply network. Each nodal controller includes at least one output port configured to be connected to an electrical load operating with a voltage of multiple different voltages. The at least two power sources are associated with the multiple different voltages and configured to supply the multiple nodal controllers through the power supply network. The power supply network includes a power line connecting the multiple nodal controllers to each other in a ring and is configured to supply the multiple nodal controllers with electrical power from the at least two power sources. Each nodal controller of the multiple nodal controllers is linked to the power line via a bidirectional DC/DC converter and is configured to control a sleep or a wake-up mode responsive to detection of a corresponding voltage transition within the power supply network.

20 Claims, 4 Drawing Sheets

(56) References Cited

U.S. PATENT DOCUMENTS

| | | | | |
|---|---|---|---|---|
| 2015/0138954 A1* | 5/2015 | Ross | ................ | H04L 41/0654 370/389 |
| 2015/0214770 A1* | 7/2015 | Chen | ................ | H02J 1/08 320/135 |
| 2015/0271019 A1* | 9/2015 | Reich | ................ | H04L 41/145 709/221 |
| 2016/0101748 A1* | 4/2016 | Ambrosio | ................ | H02M 3/07 307/10.1 |
| 2016/0118789 A1* | 4/2016 | Fornage | ................ | H02J 3/381 307/52 |
| 2017/0144553 A1* | 5/2017 | Steele | ................ | B60L 3/0046 |
| 2019/0009684 A1 | 1/2019 | Yasunori | | |
| 2020/0125858 A1* | 4/2020 | Bauer | ................ | G06K 9/6289 |
| 2020/0156476 A1* | 5/2020 | Suzuki | ................ | B60L 3/0046 |
| 2020/0381927 A1* | 12/2020 | Feng | ................ | H02J 1/10 |
| 2021/0028641 A1* | 1/2021 | Ilic | ................ | H02J 7/00714 |
| 2021/0068199 A1* | 3/2021 | Hirano | ................ | H04W 40/28 |
| 2022/0140626 A1* | 5/2022 | Kahn | ................ | H02H 7/18 320/135 |

FOREIGN PATENT DOCUMENTS

| | | | | |
|---|---|---|---|---|
| DE | 102016224618 | | 6/2018 | |
| WO | WO-2020044938 A1 * | | 3/2020 | ............... B60L 1/00 |

OTHER PUBLICATIONS

Mihara, WO2020044938 translation, Power supply system, Mar. 2020 (Year: 2020).*

"Extended European Search Report", EP Application No. 21179198.3, dated Nov. 26, 2021, 9 pages.

Wu, "Control of a Super-capacitor Based Energy Storage System", Dec. 31, 2013, 196 pages.

* cited by examiner

ELECTRICAL ARCHITECTURE

INCORPORATION BY REFERENCE

This application claims priority to European Patent Application Number EP21179198.3, filed Jun. 14, 2021, the disclosure of which is incorporated by reference in its entirety.

BACKGROUND

Taking the automotive field as an example, the electrical architecture typically comprises a first battery of 48V that may be used for at least powering an electric motor of a hybrid vehicle, and a second battery of 12V that may be used to power other more standard elements such as vehicle headlights, starter motor, electronic components, etc. The different elements to be powered are typically divided in several groups which are each powered by a power delivery point which can be referred to as a zone controller. Accordingly, the electrical architecture comprises several zone controllers as nodal points for supplying the electric consumers of the architecture.

The classical electrical architecture is usually made using radial connecting lines, i.e., those that are compliant with a star scheme, so as to form wye connections. In such a scheme, the zone controllers can be separately powered by the appropriate battery, namely by the battery having the appropriate voltage for the consumers connected to the related zone controller. One of the drawback of such architecture lies in the fact that in case of failure of the battery or the supply line connecting the battery to the zone controller, all the consumers connected thereto are impacted and shut down.

Other kinds of architecture may be implemented for supplying power to the consumers through the zone controllers, for example by doubling at least some power lines between the battery and the zone controllers. In such a case, if there is a failure in one of the power lines supplying a zone controller, the other redundant line will ensure the supply of electricity to the zone controller, thus maintaining the functionality of the consumers connected thereto. However, providing additional power lines as redundant connections in an electrical architecture is very expensive, especially due to the significant cross-section of the power lines or cables and due to the number of repetitive electrical architectures that are required to be made in order to provide several hundred thousand motor vehicles, for instance.

Another way to prevent battery failures is to provide the electrical architecture with batteries having a high level of confidence, namely with batteries which are more reliable than the average. Batteries may be defined by security or reliability levels that are known in the automotive industry under a standard which is named ASIL, as an acronym for Automotive Safety Integrity Level (ASIL). ASIL is a risk classification scheme defined by the Functional Safety for road Vehicles standard. ASIL provides a classification (ASIL-A, ASIL-B, ASIL-C and ASIL-D) that helps to define the safety requirements necessary to be in line with one of the ISO standards. The ASIL is established by performing a risk analysis of a potential hazard by looking at the severity, exposure and controllability of the vehicle operating scenario. ASIL-D dictates the highest integrity requirements on the product, such as a battery, and ASIL-A dictates the lowest. Accordingly, a battery that is stamped, e.g., ASIL-B will be more reliable and secure than a battery that is stamped ASIL-A. However, ASIL-B products are more expensive than ASIL-A products. Therefore, raising the ASIL level of batteries to prevent failures in an electrical architecture may become very expensive if the architecture must be provided hundreds of thousands of times, for example.

In addition, it should be noted that if a consumer having, e.g., an ASIL-C level is connected to a zone controller, the latter is supplied by a battery having at least the same ASIL level or by two batteries having each at least an ASIL-B level. Accordingly, one can understand that powering consumers with a relatively high ASIL-level using a zone controller can lead to an expensive electrical architecture. Indeed, it is important that a simple failure in the power supply of the architecture, comprising batteries and power lines, does not lead to the loss of the function that is provided by the consumer (electrical load) connected to the zone controller. It is a challenge to satisfy such a requirement while providing a lower cost electrical architecture.

Document US 2020/0156476 A1 discloses "a power supply system that can suitably configure a plurality of power supply systems with different voltages."

U.S. Pat. No. 5,396,970 discloses "an electromotive scooter which gets its driving force from an electric motor driven by batteries mounted thereon." The power source unit "supplies power of nominal value of 48V to the electric motor that requires high voltage to exert high driven performance and also supplies power of nominal value of 12V via an auxiliary power source to the other electric devices."

Document US 2019/0009684 A1 relates to "a power system that is able to readily address design changes, together with suppressing leakage current from a conduction path of a high voltage to a conduction path of a low voltage."

However, since the devices or systems provided in the background are unable to solve the previously cited issues, there is a need for improving existing disclosures in order to at least partially overcome the aforementioned drawbacks. In particular, it is suitable to propose a new approach that is more efficient, especially more cost-effective, while maintaining a high level of security and reliability.

SUMMARY

The present disclosure relates to the field of electricity and/or electronics, more particularly to electrical architecture that includes, among others, electrical wiring or cables that are used to power various electrical equipment and/or electronic devices within a vehicle for example.

More specifically, the present disclosure concerns an electrical architecture including at least two power sources, having different voltages, for supplying a plurality of nodal controllers through a power supply network, as well as a vehicle comprising such an electrical architecture.

To at least partially address the concerns set forth above, the present disclosure provides an electrical architecture comprising at least two power sources, which have different voltages, for supplying a plurality of nodal controllers through a power supply network, with each of the nodal controllers being provided with at least one output port for connecting thereto an electrical load operating with one of the different voltages. According to the present disclosure, the power supply network comprises a power line connecting the nodal controllers in a ring to each other and supplies the nodal controllers with electrical power from the at least two power sources. Each nodal controller is linked to the power line via a bidirectional DC/DC converter.

Due to the features of the above electrical architecture, in the event that one of the at least two power sources has a failure or one section of the power line (e.g. between two nodal controllers) is cut, all the nodal controllers of a given ring can advantageously still be powered. In addition, due to the bidirectional DC/DC converter with which each nodal controller is equipped, the appropriate voltage can still be supplied to the at least one output port of the nodal controller, even with one of the noted failures. Therefore, the electrical load connected thereto will advantageously continue to be properly powered. This particularly important if the electrical load concerns a consumer having a critical role to play, such as security features for instance.

Furthermore, the electrical architecture of the present disclosure ensures a good reliability with power sources having a relatively low ASIL level and without redundant power lines or at least with a minimum or reduced number of redundant power lines. Consequently, the above electrical architecture is particularly cost-effective while being reliable.

In one aspect, the bidirectional DC/DC converter provides a stabilized output voltage.

According to another aspect, the electrical architecture of the present disclosure can work in a first operating mode in which the bidirectional DC/DC converter converts the voltage of one of the power sources to a voltage corresponding to the voltage of another one of said power sources.

In a further aspect, the aforementioned electrical architecture can work in a second operating mode in which the bidirectional DC/DC converter converts the voltage of one of the power sources to a same voltage.

According to one aspect, the same operating mode is applied to all the nodal controllers.

In one aspect, the operating mode, more specifically at least one of the aforementioned operating modes, is controlled by the nodal controller that is closest to the power source that supplies it with power.

In another aspect, the operating mode, more specifically at least one of the aforementioned operating modes, is controlled by a master unit connected to at least one of the nodal controllers.

In some aspects, the nodal controllers detect input signals provided by the power sources in the power line of the power supply network in order to determine a power supply failure at the nodal controllers.

In one aspect, the nodal controllers detect an input signal provided by the power sources in the power line of the power supply network in order to determine a sleep mode or a wake-up mode at the nodal controllers.

In some aspects, the sleep mode is defined by converting, within the power supply network, a high voltage provided by one of the power sources into a lower voltage, such as into the lowest voltage delivered by said power sources, and the wake-up mode is defined by converting, within the power supply network, a low voltage provided by one of the power sources into a higher voltage, such as into the highest voltage delivered by said power sources.

In a further aspect, the sleep mode and/or the wake-up mode is controlled by any one of the nodal controllers or by at least one master unit connected to at least one of the nodal controllers.

In some aspects, the power sources are provided by electric batteries.

In some aspects, the power sources provide voltages among 48V, 24V and 12V.

In another aspect, the electrical architecture further comprises a data communication network comprising a communication line connecting the nodal controllers in a ring to each other and supplying the nodal controllers with data or information.

The present disclosure further relates to a vehicle, such as a motor vehicle, comprising an electrical architecture according to any implementations of said electrical architecture or according to any possible combination of the example implementations.

Other implementations and advantages will be disclosed hereafter in the detailed description.

BRIEF DESCRIPTION OF THE DRAWINGS

The disclosure and the implementations provided in the present description should be taken as non-limitative examples and will be better understood with reference to the attached figures in which.

DETAILED DESCRIPTION

Figure 1:
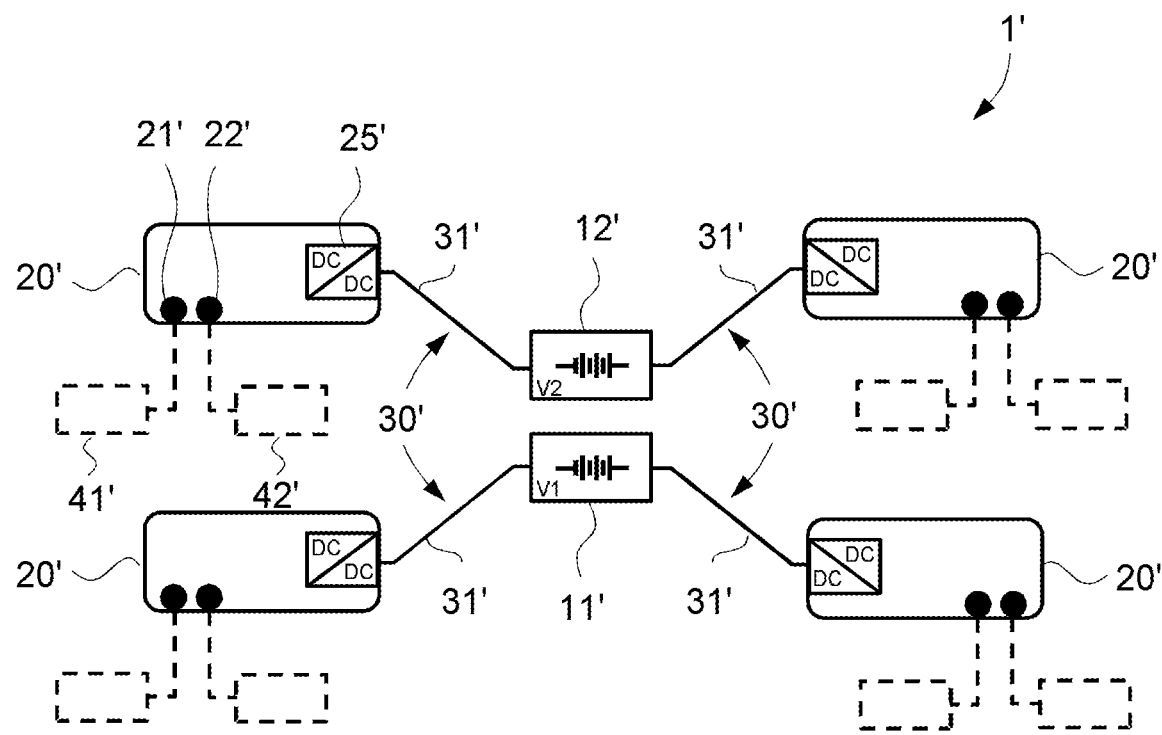
FIG. 1 is a schematic representation of an example of an electrical architecture according to the background.

FIG. 1 depicts an example of an electrical architecture 1' according to the background. In the example of FIG. 1, the electrical architecture 1' includes two rechargeable batteries 11', 12' having their own voltage. For example, the voltage V1 of the first rechargeable battery 11' could be 12V, and the voltage V2 of the second battery could be 24V. The rechargeable batteries 11', 12' supply zone controllers 20' via power lines 31', which all together define a power supply network 30'. More specifically, each zone controller 20' is directly connected to one of the rechargeable batteries 11', 12' via a power line 31'. Accordingly, the power supply network 30' includes radial power lines 31' which form a star scheme, i.e., provided with wye electrical connections.

Each zone controller 20' may be regarded as a hub to which some electrical consumers 41', 42' can be connected via output ports 21', 22' of the zone controller 20'. Accordingly, all the electrical consumers 41', 42' are distributed between the zone controllers 20'. Each zone controller 20' further includes a DC/DC converter 25' to provide the appropriate voltage to the output port 21', 22' from the voltage V1, V2 of the rechargeable battery 11', 12' to which it is connected. Accordingly, the electrical consumers 41', 42' are supplied with the appropriate voltage.

Figure 2:
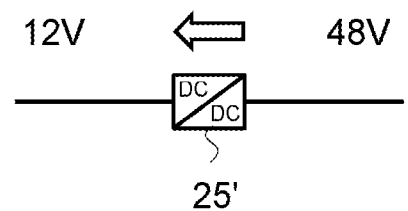
FIG. 2 is a schematic representation of the effect of the DC/DC converter that is comprised in the zone controllers of FIG. 1.

FIG. 2 depicts an example of the DC/DC converter 25' that is included in the zone controller 20' of the electrical architecture 1' of FIG. 1. The DC/DC converter 25' is able to convert an input voltage into an output voltage that is different from the input voltage. As shown in the example of FIG. 2, the DC/DC converter 25' may convert a first voltage of 48V in a second voltage of 12V. Alternately, it may convert a first voltage of 12V in a second voltage of 24V for example. The electrical architecture 1' of FIG. 1 may typically be implemented in a motor vehicle and the electrical consumers 41', 42' working under the same voltage, e.g. 12V, can generally not all be located in the same place or near the battery which provides the appropriate voltage (e.g., 12V) that they need. Therefore, the DC/DC converter 25' of the zone controller 20' can provide the appropriate voltage to the electrical consumers 41', 42' that it supplies.

The electrical architecture 1' of FIG. 1 has several issues that have been already presented in the above background part of the present description. The present disclosure aims to overcome at least a part of these issues. Accordingly, a new electrical architecture 1 is presented in FIGS. 3 to 6 that are detailed below.

Figure 3:
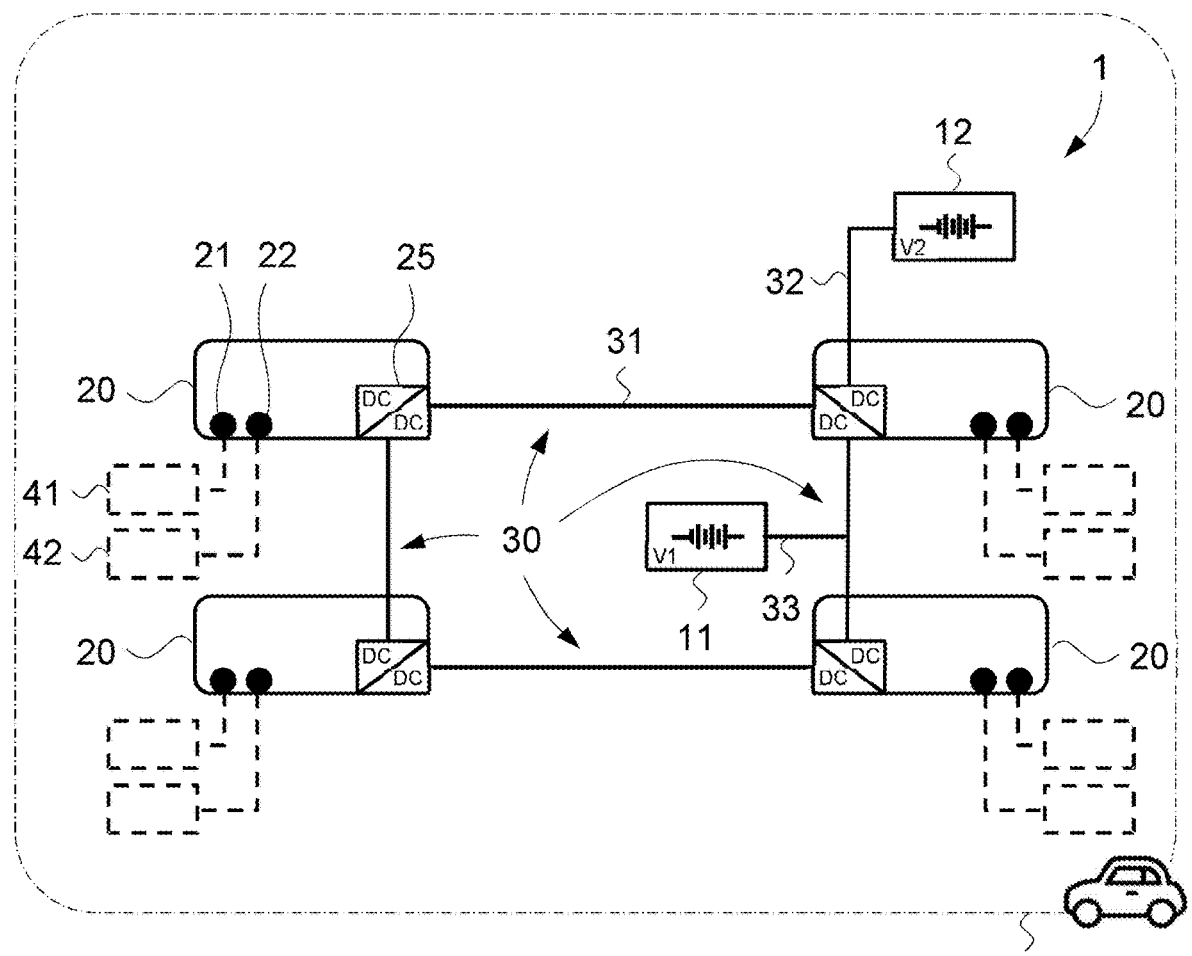
FIG. 3 is a schematic representation of an example implementation of the electrical architecture according to the present disclosure.

FIG. 3 is a schematic representation of an implementation of the electrical architecture 1 of the present disclosure. Although the adjective "electrical" is used to qualify the electrical architecture 1, it should be understood that it may relate to an electrical and/or electronical architecture. The electrical architecture 1 includes at least two power sources 11, 12, having different voltages V1, V2 (respectively), for supplying a plurality of nodal controllers 20 through a power supply network 30.

The nodal controllers could also be referred to as zone controllers or zonal controllers. Nodal controllers 20 are emerging as key elements, especially in automotive industry, and open the way for more advanced capabilities. They can be regarded as nodes, for example in a vehicle, that segment the electrical and electronic architecture and serve as hubs for power distribution (and data connection requirements, if any) for electrical devices such as various sensors, peripherals and actuators, within a physical section of the vehicle. The aforementioned electrical devices are electrical consumers which can be referred to as electrical loads 41, 42. Using nodal controllers 20 in such an electrical architecture 1 simplifies cabling, which can allow more of the wiring harness assembly to be automated, thus reducing costs.

As shown, e.g., in FIG. 3, each nodal controller 20 is provided with at least one output port 21, 22 for connecting thereto an electrical load 41, 42 operating with one of the aforementioned voltages V1, V2.

In contrast with the electrical architecture 1' of the background shown in FIG. 1, the electrical architecture 1 of FIG. 3 is provided with at least the following features. First, the power supply network 30 includes a power line 31 connecting the nodal controllers 20 in a ring to each other and supplying the nodal controllers 20 with electrical power from the aforementioned at least two power sources 11, 12. Second, each nodal controller 20 is linked to the power line 31 via a bidirectional DC/DC converter 25.

The power line 31 successively links each nodal controller 20, from the first one to the last one, before connecting the last nodal controller 20 to the first one. Therefore, the power supply network 30 connects each nodal controller 20 along a power line 31 which has a ring shape, namely which can be regarded as a closed power line.

Figure 5:
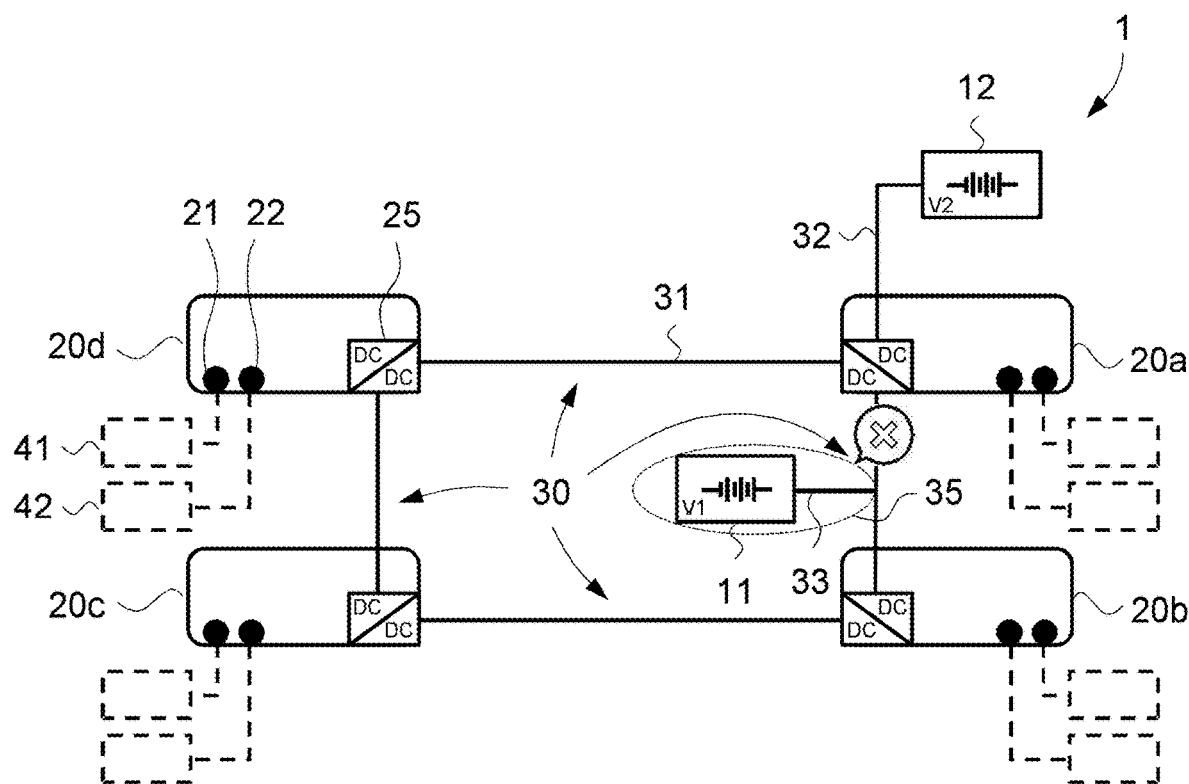
FIG. 5 is a schematic representation of an example possible failure scenario occurring in the electrical architecture of FIG. 3.
Figure 6:
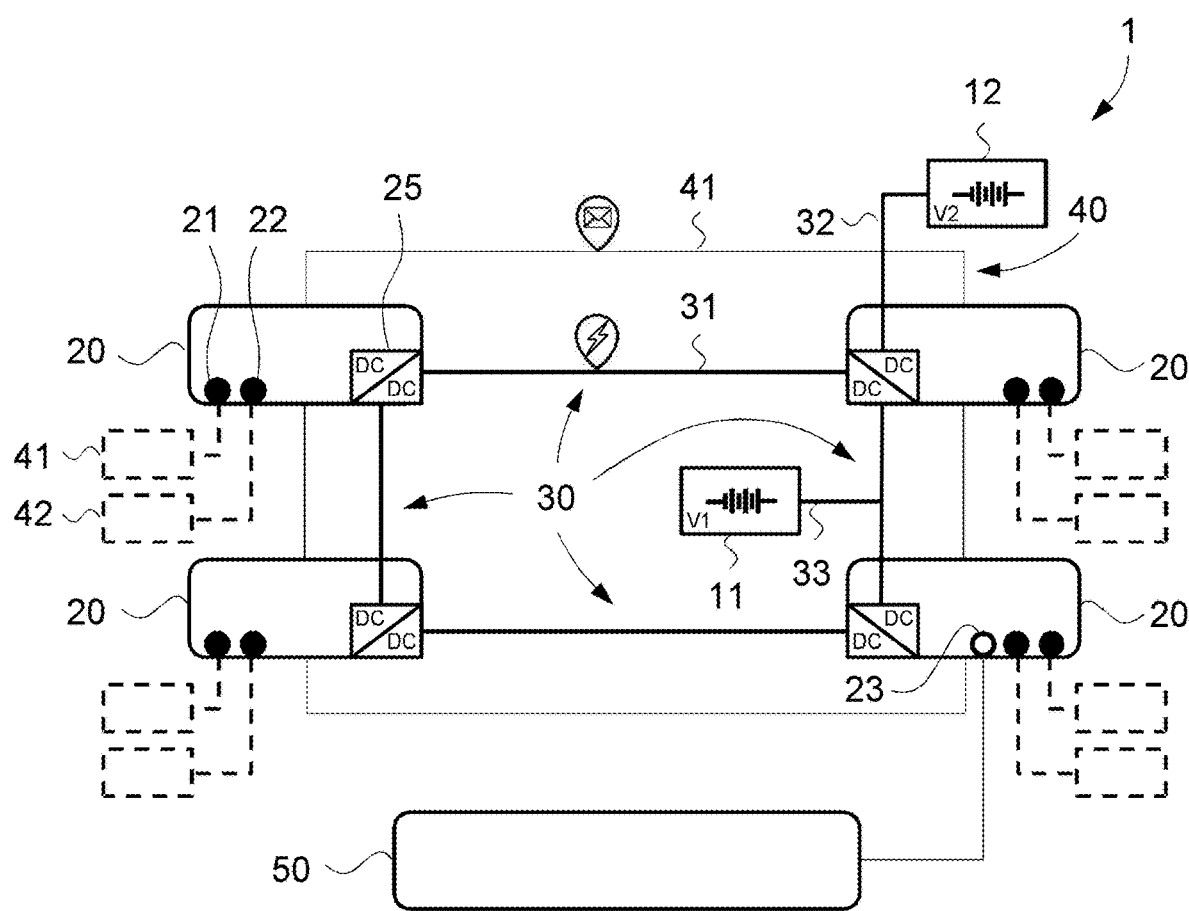
FIG. 6 shows variants of the example implementation depicted in FIG. 3.

In some cases, for supplying the nodal controllers 20 through the power supply network 30, the power sources 11, 12 are connected to the power supply network 30 via at least a power line segment 32, 33. In the example of FIGS. 3, 5 and 6, the first power source 11 is connected to the power line 31 via the power line segment 33. The second power source 12 is connected to the power line 31 via the power line segment 32 as well as via one of the nodal controller 20, in particular the DC/DC converter 25 of the nodal controller 20. In both cases, the aforementioned power line segments 32, 33 can be regarded as being part of the power supply network 30, so that the latter includes the power line 31 and the power line segments 32, 33. It should be understood that more than one power source could be connected to a nodal controller 20, such as via its DC/DC converter 25, using a power line segment such as the power line segment 32.

Figure 4:
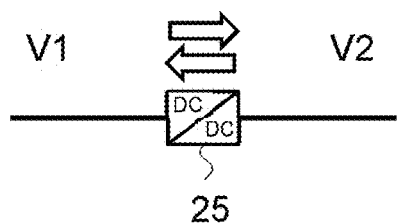
FIG. 4 is a schematic representation of the effects of the bidirectional DC/DC converter that is comprised in the nodal controllers of FIG. 3.

According to the present disclosure and as schematically depicted in FIG. 4, the DC/DC converters are realized as a bidirectional DC/DC converter 25, so that they are each able to convert a first voltage V1 to a second voltage V2 and to convert the aforementioned second voltage V2 to the aforementioned first voltage V1. Therefore, in contrast to the DC/DC converter 25' of the background (FIG. 2), which are single way converters, the bidirectional DC/DC converters 25 that are included in the nodal controllers 20 of the present disclosure can be regarded as two-way converters. In some cases, the bidirectional DC/DC converter 25 is controlled by the nodal controller 20 which hosts it.

From the foregoing, the present disclosure may also be formulated as an electrical architecture 1 comprising a plurality of nodal controllers 20 connected in a ring to each other by a power line 31 supplying said nodal controllers 20 with electrical power from at least two power sources 11, 12 having different voltages V1, V2; each of the nodal controllers 20 being provided with at least one output port 21, 22 for connecting thereto an electrical load 41, 42 operating with one of said voltages V1, V2, and each nodal controller being linked to the power line 31 via a bidirectional DC/DC converter 25 that could be controlled by said nodal controller 20.

Due to the features of the present electrical architecture 1, the nodal controllers can be powered even if there is a failure at one of the at least two power sources and/or if one of the segments of the power line 31 is damaged or cut for any reason. Furthermore, the appropriate voltage can always be supplied to any of the output ports 21, 22 of any of the nodal controllers 20 due to the bidirectional DC/DC converter 25 that is provided therein. Therefore, the electrical loads 41, 42 connected to the nodal controllers 20 will continue to operate normally. It is particularly important if they have to ensure significant functions, such as security tasks for example. Moreover, as shown in FIGS. 3, 5 and 6, the electrical architecture 1 needs no redundant power lines and can be powered with power sources 11, 12 having lower ASIL levels than the electrical load 41, 42 which have a relatively higher ASIL level, while ensuring an efficient reliability. In other words, the electrical architecture 1 appears to be particularly cost-effective and reliable.

FIG. 5 is a schematic representation of a possible failure scenario that may occur in the electrical architecture 1 that is the same as the implementation shown in FIG. 3. To better distinguish between nodal controllers 20 that may be identical to each other, the four nodal controllers 20 shown in the example of FIG. 5 have been identified by the reference numbers 20*a*, 20*b*, 20*c* and 20*d*. In the present example, it has been considered that a failure occurs in the electrical architecture 1 at the level of the first power source 11. Such a failure is located within the dotted oval line that is labeled with a pictogram representing a cross to indicate that there is a failure. The failure may be in the power source 11 or within the power line segment 33 that connects the power source 11 to the power line 31.

Due to the features of the electrical architecture 1, one can note that such a failure does not affect the operation of the nodal controllers 20*a* to 20*b* given that they can further be powered via the second power source 12 that is connected to the nodal controller 20*a*, especially to the power line 31 via the bidirectional DC/DC converter 25 of the nodal controller

20a. Since such a bidirectional DC/DC converter 25 is present in each of the nodal controllers 20, the voltage V2 delivered by the remaining available second power source 12 can advantageously still be converted, by any nodal controller 20, into the voltage V1 that should be delivered by the first power source 11. Indeed, since the bidirectional DC/DC converters 25 are two-way converters, the voltages V1, V2 can respectively be converted into voltages V2, V1, for example, whatever the voltage value received at the input of the bidirectional DC/DC converter 25.

Alternatively or in addition to the above failure, if another failure occurs in any one of the segments of the power line 31 linking the nodal controller 20a, 20b, 20c and 20d to each other, these will still not be affected by the failure(s). Indeed, if the power line segment located, e.g., between the nodal controllers 20a and 20d is cut for any reason, each of the nodal controllers 20a, 20b, 20c and 20d can still be powered, e.g., by the second power source 12 through the remaining portions of the power supply network 30, in particular through the power line segments successively linking the nodal controllers 20a, 20b, 20c and 20d.

Therefore, these failure scenarios show that the electrical architecture 1 of the present disclosure is reliable and provides a significant operational safety ensuring the powering of the electrical loads 41, 42 of each of the nodal controllers 20, without requiring redundant power line segments among others. It means that the present disclosure allows to rationalize the number of connection lines within the electrical architecture 1, while increasing its security level or at least maintaining at a minimum required level.

According to one aspect, the bidirectional DC/DC converter 25, of at least one of the nodal controller 20, provides a stabilized output voltage. Therefore, the voltage output by the bidirectional DC/DC converter 25 remains constant regardless of the electrical load 41, 42 applied to the nodal controller 20 hosting the aforementioned bidirectional DC/DC converter 25.

In one aspect, the bidirectional DC/DC converter 25 converts the voltage V1, V2 of one of the power sources 11, 12 into a voltage corresponding to the voltage V2, V1 of another one of the power sources 11, 12. Such an approach may be referred to as a first operating mode. For example, the bidirectional DC/DC converter 25 may convert a first voltage of 48V into a second voltage of 12V, and it can therefore also convert the second voltage of 12V into the first voltage of 48V due to its two-way function. It should be understood that the aforementioned voltage values are provided as non-limitative examples.

In one aspect, the nodal controllers 20 are intended, via their bidirectional DC/DC converter 25, to provide one predefined voltage at each of their output ports 21, 22, independently of the supply voltage they receive in input.

In a further aspect or a second operating mode, the bidirectional DC/DC converter 25 converts the voltage V1, V2 of one of the power sources 11, 12 to the same voltage V1, V2. For example, the bidirectional DC/DC converter 25 may convert a 12V input voltage to a 12V output voltage as well. In such a case, one can still consider that there is a conversion, especially if the bidirectional DC/DC converter 25 converts a non-stabilized input voltage V1 (or V2) to a stabilized voltage of the same value V1 (or V2).

In some aspects, the same operating mode, namely the above cited first or second operating mode, is applied not only to one or some nodal controllers 20, but to all the nodal controllers 20 of the electrical architecture 1.

In some aspects, any of the operating modes (e.g., first and/or second operating mode) is controlled by the nodal controller 20 that is closest to the power source 11, 12 that supplies it with power. Therefore, if one of the power sources 11, 12 has a failure, the nodal controller 20 that is located close to the defective power source within the ring defined by the power line 31 may be the first to detect the failure. In the event that several nodal controllers 20 may be considered as a candidate for being the so-called closest nodal controller, one of them may be elected to control the operating mode.

In one aspect, any of the operating modes (e.g., first and/or second operating mode) is controlled by a master unit 50 connected to at least one of the nodal controllers 20, as schematically depicted in FIG. 6. Typically, the master unit 50 may be an electronic control unit (ECU), namely a small entity that is responsible for controlling at least one specific function or device. In the example shown in FIG. 6, the master unit 50 is connected to one of the nodal controllers 20, more specifically to an input port 23 of the nodal controller 20.

According to another aspect, the nodal controllers 20 are intended to detect input signals, such as voltage signals for example, provided by the power sources 11, 12 in the power line 31 of the power supply network 30. Such a feature provides the nodal controllers 20 with one possible way to determine any power supply failure, in particular to detect the failure at the nodal controllers 20 (even if the failure occurs outside the nodal controller, e.g. in a power line segment, within the power source or elsewhere in the power supply network). Alternatively, such a feature provides the nodal controllers 20 with one possible way to determine a sleep mode or a wake-up mode at the nodal controllers 20. The sleep mode can be regarded as a low-power mode and the wake-up mode as a high-power mode.

In some aspects, the sleep mode is defined by converting, within the power supply network 30, a high voltage provided by one of the power sources 11, 12 into a lower voltage. The lower voltage may be the lowest voltage delivered by the power sources 11, 12. In some aspects, the wake-up mode is defined by converting, within the power supply network 30, a low voltage provided by one of the power sources 11, 12 into a higher voltage, for example into the highest voltage delivered by the power sources 11, 12.

At least one of the sleep mode or the wake-up mode may be controlled by any one of the nodal controllers 20 or by at least one master unit 50 connected to at least one of the nodal controllers 20, as depicted in FIG. 6 for example.

In one aspect, leaving the sleep mode may be detected by at least one of the nodal controllers 20 and the master unit 50. Such detection may be initiated by a dedicated input that may carry a wake-up signal triggered, for example, when the user of the motor vehicle starts the vehicle, assuming that the electrical architecture 1 is implemented within a motor vehicle. The nodal controller 20 or the maser unit 50 that detects any of the sleep mode or wake-up mode may inform the other nodal controllers 20 that they should switch into the appropriate mode. The power supply network 30, in particular the power line 31 that successively connects all the nodal controllers 20 to each other, may be used for such a purpose.

Accordingly, there is advantageously no need to add a specific line or network for transmitting information allowing to switch the nodal controllers 20 into the appropriate mode (e.g., sleep mode or wake-up mode). This is because such information may be interpreted by any of the nodal controllers 20 when it detects a voltage transition or conversion, e.g., from V1 to V2 or from V2 to V1, within the power supply network 30, especially within the power line 31 to which it is connected. One of the advantages resulting from using the power supply network 30 to carry such information (e.g., a command for switching to the sleep mode or to the wake-up mode) lies in the fact that the information is transmitted in a very quick manner, almost instantaneously, from one nodal controller 20 to the others. In particular, the transmission is much faster than using a dedicated parallel data network based on a multiplexed communication for example. It should be noted that in the aforementioned example of the user wanting to start the engine of the motor vehicle, the information speed to wake-up the nodal controllers 20 is determinant Indeed, it is unimaginable to delay starting the motor vehicle once the user has activated the system for starting the engine, e.g., by turning the ignition key or pressing the starting button.

In some aspects, the power sources 11, 12 provide voltages among 48V, 24V and 12V, such as at least one voltage of 48V and at least one voltage of 12V.

According to another aspect integrated as an additional possibility in FIG. 6, the electrical architecture 1 further includes a data communication network 40 comprising a communication line 41 connecting the nodal controllers 20 in a ring to each other and supplying the nodal controllers 20 with data or information. The data communication network 40 may be a multiplex data communication network.

In order to better distinguish the communication line 41 and the power line 31 shown in FIG. 6, the communication line 41 has been labeled with a pictogram representing an envelope that symbolizes the transmission of a message of data. In contrast, the power line 31 of the power supply network 30 has been labeled with another pictogram representing a lightning. The communication line 41 of the data communication network 40 can be used to carry numerous data or information that may be useful to the nodal controllers 20. Contrary to the power line 31, the communication line 41 has no requirement to transmit said data or information at high speed rates. Accordingly, the communication line 41 is particularly convenient for carrying multiplexed data.

As schematically depicted in FIG. 3, the present disclosure can further relate to a vehicle 60, in particular a motor vehicle, comprising an electrical architecture 1 according to any of its implementations or according to any possible combination of its implementations.

Although an overview of the inventive subject matter has been described with reference to specific example implementations, various modifications and changes may be made to these implementations without departing from the broader spirit and scope of implementations of the disclosure disclosed in the present description.

What is claimed is:

1. An electrical architecture comprising:
multiple nodal controllers, each nodal controller including at least one output port configured to be connected to an electrical load operating with a voltage of multiple different voltages;
at least two power sources associated with the multiple different voltages and configured to supply the multiple nodal controllers through a power supply network; and
the power supply network including a power line connecting the multiple nodal controllers to each other in a ring, the power supply network configured to supply the multiple nodal controllers with electrical power from the at least two power sources,
each nodal controller of the multiple nodal controllers linked to the power line via a bidirectional DC/DC converter,
each power source of the at least two power sources connected to the power line via a power line segment,
at least one power source of the at least two power sources further connected to the power line via a bidirectional DC/DC converter associated with a nodal controller of the multiple nodal controllers,
the multiple nodal controllers configured to detect input signals provided by the at least two power sources via the power line of the power supply network,
each nodal controller of the multiple nodal controllers configured to control a voltage-decreasing mode or a voltage-increasing mode responsive to detection of a voltage signal associated with a mode switch of the power supply network, the voltage signal carried over at least a portion of the power line of the power supply network, the voltage signal associated with a mode switch including a transition from a voltage of the multiple different voltages that corresponds to a power source of the at least two power sources of the power supply network to another voltage of the multiple different voltages that corresponds to another power source of the at least two power sources of the power supply network,
the voltage-decreasing mode corresponding to converting, within the power supply network, a relatively higher voltage of the multiple different voltages provided by a power source of the at least two power sources into a relatively lower voltage of the multiple different voltages, and
the voltage-increasing mode corresponding to converting, within the power supply network, a relatively lower voltage of the multiple different voltages provided by a power source of the at least two power sources into a relatively higher voltage of the multiple different voltages.

2. The electrical architecture of claim 1, wherein a bidirectional DC/DC converter of at least one nodal controller of the multiple nodal controllers is configured to provide a stabilized output voltage.

3. The electrical architecture of claim 1, wherein, in a first operating mode, a bidirectional DC/DC converter of at least one nodal controller of the multiple nodal controllers is configured to convert a voltage of the multiple different voltages corresponding to a power source of the at least two power sources to another voltage of the multiple different voltages corresponding to another power source of the at least two power sources.

4. The electrical architecture of claim 3, wherein, in a second operating mode, a bidirectional DC/DC converter of at least one nodal controller of the multiple nodal controllers is configured to convert a voltage of the multiple different voltages corresponding to a power source of the at least two power sources to a same voltage of the multiple different voltages.

5. The electrical architecture of claim 4, wherein the first operating mode or the second operating mode is applied to all nodal controllers of the multiple nodal controllers.

6. The electrical architecture of claim 4, wherein:
the electrical architecture is configured such that an operating mode for voltage conversion is controlled with the voltage signal by a nodal controller of the multiple nodal controllers that is closest to a power source of the at least two power sources that supplies the nodal controller with power within the ring defined by the power line; and
responsive to two or more nodal controllers of the multiple nodal controllers being considered as a candidate as a closest nodal controller, the multiple nodal controllers are configured to elect one nodal controller to control the operating mode using at least one of the ring of the power supply network or a communication line of a data communication network of the electrical architecture.

7. The electrical architecture of claim 4, further comprising:
a master unit connected to at least one nodal controller of the multiple nodal controllers, the master unit configured to control an operating mode for voltage conversion.

8. The electrical architecture of claim 1, wherein the multiple nodal controllers are configured to detect input signals provided by the at least two power sources in the power line of the power supply network to determine a system failure at a nodal controller of the multiple nodal controllers.

9. The electrical architecture of claim 8, wherein the system failure comprises a failure of a line of the power supply network.

10. The electrical architecture of claim 9, wherein the failed line of the power supply network comprises a power line segment connecting a power source of the at least two power sources.

11. The electrical architecture of claim 9, wherein the failed line of the power supply network comprises at least a portion of the power line connecting the multiple nodal controllers to each other in the ring.

12. The electrical architecture of claim 8, wherein the system failure comprises a failure of a power source of the at least two power sources.

13. The electrical architecture of claim 12, wherein the failed power source of the at least two power sources comprises at least one battery.

14. The electrical architecture of claim 1, wherein the at least two power sources include at least two electric batteries.

15. The electrical architecture of claim 1, wherein the at least two power sources are configured to provide the multiple different voltages, the multiple different voltages including at least two voltages selected from a group of voltages comprising 48 Volts (V), 24V, and 12V.

16. The electrical architecture of claim 1, further comprising:
a data communication network including a communication line connecting the multiple nodal controllers together in another ring, the data communication network configured to supply the multiple nodal controllers with data or information.

17. The electrical architecture of claim 1, wherein the electrical architecture is configured to signal a system failure via the voltage signal.

18. The electrical architecture of claim 1, wherein:
each nodal controller of the multiple nodal controllers is configured to provide a predefined voltage at the at least one output port thereof independently of an input supply voltage; and
each nodal controller of the multiple nodal controllers is configured to use the bidirectional DC/DC converter associated therewith to convert the input supply voltage to the predefined voltage based on the detection of the voltage signal.

19. A vehicle including an electrical architecture, the electrical architecture comprising:
multiple nodal controllers, each nodal controller including at least one output port configured to be connected to an electrical load operating with a voltage of multiple different voltages;
at least two power sources associated with the multiple different voltages and configured to supply the multiple nodal controllers through a power supply network; and
the power supply network including a power line connecting the multiple nodal controllers to each other in a ring, the power supply network configured to supply the multiple nodal controllers with electrical power from the at least two power sources,
each nodal controller of the multiple nodal controllers linked to the power line via a bidirectional DC/DC converter,
each power source of the at least two power sources connected to the power line via a power line segment,
at least one power source of the at least two power sources further connected to the power line via a bidirectional DC/DC converter associated with a nodal controller of the multiple nodal controllers,
the multiple nodal controllers configured to detect input signals provided by the at least two power sources via the power line of the power supply network,
each nodal controller of the multiple nodal controllers configured to control a voltage-decreasing mode or a voltage-increasing mode responsive to detection of a voltage signal associated with a mode switch of the power supply network, the voltage signal carried over at least a portion of the power line of the power supply network, the voltage signal associated with a mode switch including a transition from a voltage of the multiple different voltages that corresponds to a power source of the at least two power sources of the power supply network to another voltage of the multiple different voltages that corresponds to another power source of the at least two power sources of the power supply network,
the voltage-decreasing mode corresponding to converting, within the power supply network, a relatively higher voltage of the multiple different voltages provided by a power source of the at least two power sources into a relatively lower voltage of the multiple different voltages, and
the voltage-increasing mode corresponding to converting, within the power supply network, a relatively lower voltage of the multiple different voltages provided by a power source of the at least two power sources into a relatively higher voltage of the multiple different voltages.

20. The vehicle of claim 19, wherein the electrical architecture is configured to signal a system failure via the voltage signal.

* * * * *